US010860801B2

(12) United States Patent
Yadav et al.

(10) Patent No.: US 10,860,801 B2
(45) Date of Patent: Dec. 8, 2020

(54) SYSTEM AND METHOD FOR DYNAMIC TREND CLUSTERING

(71) Applicant: Samsung Electronics Co., Ltd., Suwon si (KR)

(72) Inventors: Anil Yadav, Cupertino, CA (US); Melvin Lobo, Fremont, CA (US); Chutian Wang, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/248,684

(22) Filed: Jan. 15, 2019

(65) Prior Publication Data

US 2020/0081975 A1 Mar. 12, 2020

Related U.S. Application Data

(60) Provisional application No. 62/730,388, filed on Sep. 12, 2018.

(51) Int. Cl.
*G06F 17/27* (2006.01)
*G06F 16/35* (2019.01)
(Continued)

(52) U.S. Cl.
CPC .......... *G06F 40/295* (2020.01); *G06F 16/355* (2019.01); *G06F 40/40* (2020.01)

(58) Field of Classification Search
CPC .................................. G06F 17/27; G06F 16/35
See application file for complete search history.

(56) References Cited

U.S. PATENT DOCUMENTS 6,523,044 B1 * 2/2003 Muramoto .............. G06F 16/22
7,228,275 B1 * 6/2007 Endo ........................ G10L 15/32
704/231
(Continued)

FOREIGN PATENT DOCUMENTS

JP 2000112971 A 4/2000
KR 10-2016-0065372 A 6/2016

OTHER PUBLICATIONS

Gray, "Comparison of Trend Detection Methods", University of Montana, Graduate Student Theses, Dissertations, & Professional Papers, No. 228, 2007, 98 pages.
(Continued)

*Primary Examiner* — Shreyans A Patel

(57) ABSTRACT

A method includes extracting a keyword and a slot from a natural language input, where the slot includes information. The method includes determining whether the keyword corresponds to one of a plurality of formation groups. In response to determining that the keyword corresponds to a specific formation group, the method includes updating metadata of the specific formation group with the information of the slot. In response to determining that the keyword does not correspond to any of the formation groups, the method includes determining whether the keyword corresponds to one of a plurality of clusters. In response to determining that the keyword corresponds to a specific cluster, the method includes updating the specific cluster with the information of the slot. In response to determining that the keyword does not correspond to any of the clusters, the method includes creating an additional formation group that includes the keyword and the slot.

20 Claims, 10 Drawing Sheets

(51) Int. Cl.
*G06F 40/295* (2020.01)
*G06F 40/40* (2020.01)

(56) References Cited

U.S. PATENT DOCUMENTS

| | | | |
|---|---|---|---|
| 9,953,636 B2 | 4/2018 | Cohen et al. | |
| 9,977,778 B1 | 5/2018 | Perez et al. | |
| 10,055,403 B2 | 8/2018 | Bui et al. | |
| 2003/0018629 A1* | 1/2003 | Namba | G06F 16/355 |
| 2007/0106495 A1* | 5/2007 | Ramsey | G06F 40/35 |
| | | | 704/9 |
| 2007/0106496 A1* | 5/2007 | Ramsey | G06F 40/295 |
| | | | 704/9 |
| 2007/0106497 A1* | 5/2007 | Ramsey | G06F 40/295 |
| | | | 704/9 |
| 2007/0239454 A1* | 10/2007 | Paek | G10L 15/19 |
| | | | 704/257 |
| 2011/0313860 A1* | 12/2011 | Pan | G06Q 30/02 |
| | | | 705/14.58 |
| 2013/0254181 A1 | 9/2013 | Balassanian et al. | |
| 2013/0282381 A1* | 10/2013 | Mauro | G10L 15/26 |
| | | | 704/275 |
| 2018/0137854 A1 | 5/2018 | Perez | |
| 2018/0246982 A1 | 8/2018 | Lepeska et al. | |
| 2018/0307765 A1* | 10/2018 | Iwata | G06F 16/335 |

OTHER PUBLICATIONS

Bolelli et al., "Topic and Trend Detection in Text Collections Using Latent Dirichlet Allocation", European Conference on Information Retrieval (ECIR 2009): Advances in Information Retrieval, Apr. 2009, 5 pages.

Yan et al., "A Biterm Topic Model for Short Texts", Proceedings of the 22nd International Conference on World Wide Web (WWW '13), May 2013, 11 pages.

ISA/KR, International Search Report and Written Opinion of the International Searching Authority, International Application No. PCT/KR2019/011657, dated Dec. 18, 2019, 8 pages.

* cited by examiner

SYSTEM AND METHOD FOR DYNAMIC TREND CLUSTERING

CROSS-REFERENCE TO RELATED APPLICATION AND CLAIM OF PRIORITY

This application claims priority under 35 U.S.C. § 119(e) to U.S. Provisional Patent Application No. 62/730,388 filed on Sep. 12, 2018, which is hereby incorporated by reference in its entirety.

TECHNICAL FIELD

This disclosure relates generally to electronic devices. More specifically, this disclosure relates to dynamic trend clustering for natural language processing.

BACKGROUND

Methods for interacting with and controlling computing devices are continually improving in order to create more natural interfaces. Many such methods for interacting with and controlling computing devices generally require users to utilize user interface instruments, such as keyboards, mice, or touchscreens. Some electronic devices employ natural language processing that enable users to interact with computing devices via a natural language input. For example, natural language input can include a voice-enabled user interface where a user can interact with the computing device by speaking. Natural language processing is becoming the interaction method of choice for some electronic devices and appliances. An electronic device that can interpret the intended meaning of a natural language input and extract additional relevant information associated with the natural language input can play an increasingly important role in consumer satisfaction with respect to natural language processing-based user interfaces.

SUMMARY

This disclosure provides systems and methods for dynamic trend clustering.

In one embodiment, a method for trend clustering includes extracting a keyword and a slot from a natural language input, where the slot includes information. The method also includes determining whether the keyword corresponds to one of a plurality of formation groups. In response to determining that the keyword corresponds to a specific formation group of the plurality of formation groups, the method includes updating metadata of the specific formation group with the information of the slot. In response to determining that the keyword does not correspond to any of the plurality of formation groups, the method includes determining whether the keyword corresponds to one of a plurality of clusters. In response to determining that the keyword corresponds to a specific cluster of the plurality of clusters, the method includes updating the specific cluster with the information of the slot. In response to determining that the keyword does not correspond to any of the plurality of clusters, the method includes creating an additional formation group that includes the keyword and the slot.

In another embodiment, an electronic device includes at least one processor. The at least one processor is configured to extract a keyword and a slot from a natural language input, where the slot includes information. The at least one processor is also configured to determine whether the keyword corresponds to one of a plurality of formation groups. In response to determining that the keyword corresponds to a specific formation group of the plurality of formation groups, the at least one processor is configured to update metadata of the specific formation group with the information of the slot. In response to determining that the keyword does not correspond to any of the plurality of formation groups, the at least one processor is configured to determine whether the keyword corresponds to one of a plurality of clusters. In response to determining that the keyword corresponds to a specific cluster of the plurality of clusters, the at least one processor is configured to update the specific cluster with the information of the slot. In response to determining that the keyword does not correspond to any of the plurality of clusters, the at least one processor is configured to create an additional formation group that includes the keyword and the slot.

In yet another embodiment, a non-transitory machine-readable medium contains instructions that when executed cause at least one processor of an electronic device to extract a keyword and slot from a natural language input, where the slot includes information. The medium also contains instructions that, when executed, cause the at least one processor to determine whether the keyword corresponds to one of a plurality of formation groups. In response to determining that the keyword corresponds to a specific formation group of the plurality of formation groups, the medium contains instructions that, when executed, cause the at least one processor to update the metadata of the specific formation group with the information of the slot. In response to determining that the keyword does not correspond to any of the plurality of formation groups, the medium contains instructions that, when executed, cause the at least one processor to determine whether the keyword corresponds to one of a plurality of clusters. In response to determining that the keyword corresponds to a specific cluster of the plurality of clusters, the medium contains instructions that, when executed, cause the at least one processor to update the specific cluster with the information of the slot. In response to determining that the keyword does not correspond to any of the plurality of clusters, the medium contains instructions that, when executed, cause the at least one processor to create an additional formation group that includes the keyword and the slot.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
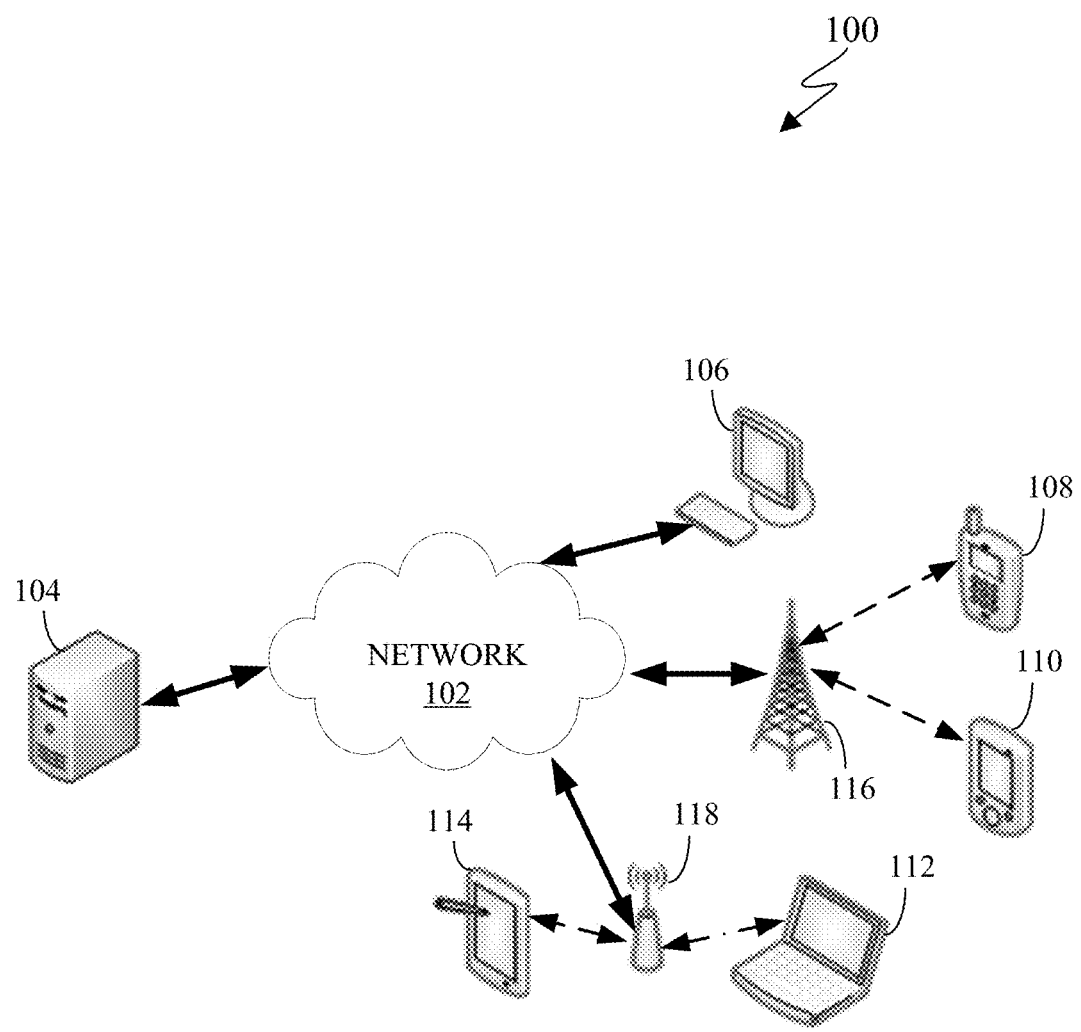
FIG. 1 illustrates an example communication system in accordance with an embodiment of this disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

This disclosure generally provides various systems and methods for controlling and interacting with computing devices. A graphical user interface allows a user to interact with an electronic device, such as a computing device, by enabling the user to locate and select objects on a screen. Common interactions include physical manipulations, such as the user physically typing on a keyboard, moving a mouse, and touching a touchscreen of a touch-sensitive surface. There are instances when utilizing various physical interactions (like touching a touchscreen) are not feasible, such as when the user wears a head-mounted display or when a device does not include a display. Additionally, there are instances when utilizing various physical interactions (such as touching a touchscreen or using an accessory like a keyboard, mouse, touchpad, remote, or the like) is inconvenient or cumbersome. Embodiments of this disclosure allow for additional approaches to interact with an electronic device. It should be noted that, as used here, the term "user" may denote a human or another device (such as an artificial intelligent electronic device) using the electronic device.

An electronic device, according to embodiments of this disclosure, can include a personal computer (such as a laptop or desktop computer), a workstation, a server, a television, an appliance, a virtual assistant, and the like. Additionally, the electronic device can be at least one of a part of a piece of furniture or building/structure, an electronic board, an electronic signature receiving device, a projector, or a measurement device. In some embodiments, the electronic device can be a portable electronic device, like a portable communication device (such as a smartphone or mobile phone), a laptop, a tablet, an electronic book reader (such as an e-reader), a personal digital assistant (PDA), a portable multimedia player (PMP), an MP3 player, a mobile medical device, a virtual reality headset, a portable game console, a camera, or a wearable device, among others. The electronic device can be one or a combination of the above-listed devices. Additionally, the electronic device as disclosed here is not limited to the above-listed devices and can include new electronic devices depending on the development of technology.

A virtual assistant, a smart assistant, an artificial intelligence (AI) assistant, a smart hub, and the like (collectively referred to here as virtual assistant devices) are a family of devices that can perform various tasks and services for a user. For example, based on a received user input, a virtual assistant device can provide a variety of services, such as providing the weather, setting an alarm, creating and maintaining a shopping list, playing music, turning on a specific appliance or television program, switching on/off a smart light bulb, finding and purchasing items, and the like. A virtual assistant device can often interact with a user through a voice-enabled user interface, such as a natural language processor. A natural language processor is based on one or more language models that enable the virtual assistant device to understand the received natural language input, such as a verbal utterance of the user, in order to perform a requested task. In some embodiments, a natural language processor can access clusters of information that provide additional relevant information associated with a received natural language input.

According to embodiments of this disclosure, a natural approach to interacting with and controlling a computing device can include a voice-enabled user interface. A voice-enabled user interface enables a user to interact with a computing device through the act of speaking. Speaking can include a human speaking directly to the electronic device or another electronic device projecting sound through a speaker. Once the computing device detects and receives the sound, the computing device can derive contextual meaning from the oral command and thereafter perform the requested task.

Natural language understanding (NLU) enables virtual assistant devices to have a greater understanding of natural language when spoken by a user. For example, if a user verbally instructs a smart phone to "call spouse," the smart phone can identify the task as a request to use the phone function, activate the phone feature of the device, look up a phone number associated with "spouse," and subsequently dial the phone number of the user's spouse. As another example, a user can verbally instruct a virtual assistant device to turn on a television and tune to a particular sporting event. The virtual assistant device can not only turn on the television but select a particular channel that is playing the requested sporting event. As used here, inputs such as a verbal utterance and a typed input can be used interchangeably. Additionally, it should be noted that natural language inputs are not limited to verbal utterances and typed inputs.

Embodiments of this disclosure include systems and methods for creating clusters that identify and group similar parameters associated with a particular concept for increasing the natural language understanding of virtual assistant devices. In some embodiments, a virtual assistant device identifies a domain that is associated with a received natural language input. The domain can include a class of applications, such as applications that can be used in education, entertainment, games, medicine, maps and navigation, messaging, news, shopping, social media, travel, and productivity to name a few. In addition to identifying the domain associated with a natural language input, the virtual assistant devices can identify the intent of the input, such as the intended action that the virtual assistant device is to perform. The virtual assistant device can thereafter identify the intent of the natural language input.

As a specific example of this, if a user verbally instructs a virtual assistant device to "book a flight," the virtual assistant device can identify the domain as travel and the indented action as purchasing a ticket for an airline flight. Slots represent information associated with the request, such as the origin, the destination, the date of travel, the time of travel, prices, number of layovers, and the like. In some embodiments, slots can be extended to include information about the destination, such as requesting whether the user needs a rental car, requesting whether the user needs a hotel, and providing a list of trending activities at the destination to name a few. It should be noted that an ontology is a set of concepts and categories and their relationships in a particular subject area or domain.

In another specific example, a virtual assistant device can receive a verbal utterance of "book a flight and tickets to" a certain music festival. Embodiments of this disclosure include systems and methods that can identify a trending event, such as the specified music festival, and gather additional parameters or slots associated with the music festival. The gathered slots can then be provided to the virtual assistant device. For instance, the provided slots can include the date of the music festival, the location of the music festival, and the time of the music festival, among others, so that the virtual assistant device can perform the requested action without requesting the information from the user.

Embodiments of this disclosure also include systems and methods for expanding ontologies that are associated with natural language understanding. A dynamic trend cluster (DTC) includes the ability to detect a trending event and automatically create a cluster of slots associated with the trending event. For example, after a virtual assistant device identifies keywords from a received input, embodiments of this disclosure can identify whether the keywords are forming a trend or event corresponding to the received input. If any of the keywords are identified as forming a trend, embodiments of this disclosure can extract one or more additional slots from the received natural language input or use slots that were extracted by the NLU system and then form or update a cluster of slots. Thereafter, an NLU ontology can cross-reference a new input to that of the cluster of slots. If keywords in the new input are related to the keywords of any of the existing clusters, the NLU ontology can gather any missing information for executing the new input based on the slots within the cluster. Creating a cluster of slots that relate to a similar event enables a virtual assistant device to perform a task without being required to obtain additional input data from the user.

Embodiments of this disclosure further include systems and methods for identifying topics that are currently trending and generating clusters of related information for each trending topic. Additionally, embodiments of this disclosure enable monitoring multivariate data to detect and identify popular trending events. Popular trending events can include sporting events, music events, news events, traffic alerts, and the like. For example, when a news topic is trending, the information concerning the news topic, such as date, time, location, weather and the like, are collected and can be used by the subsequent system consuming this data.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, the server 104 includes a DTC engine that can create clusters of slots and infer additional information for new input from the clusters. Example details of a DTC engine are provided below with respect to FIGS. 4A, 4B, and 5.

Each client device 106-114 represents any suitable computing or processing device that interacts with at least one server (such as the server 104) or other computing device(s) over the network 102. In this example, the client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, mobile device 108, PDA 110, laptop computer 112, or tablet computer 114) can be a virtual assistant device that receives natural language inputs, such as verbal utterances, from a user and performs the intended actions.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
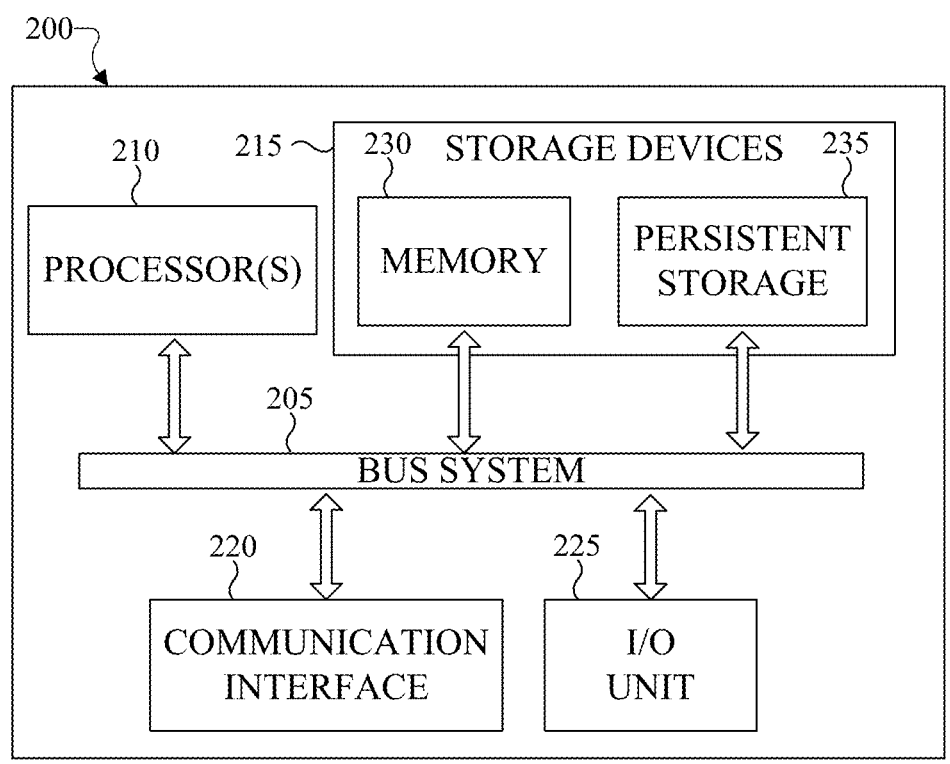
FIGS. 2 and 3 illustrate example electronic devices in accordance with an embodiment of this disclosure.
Figure 3:
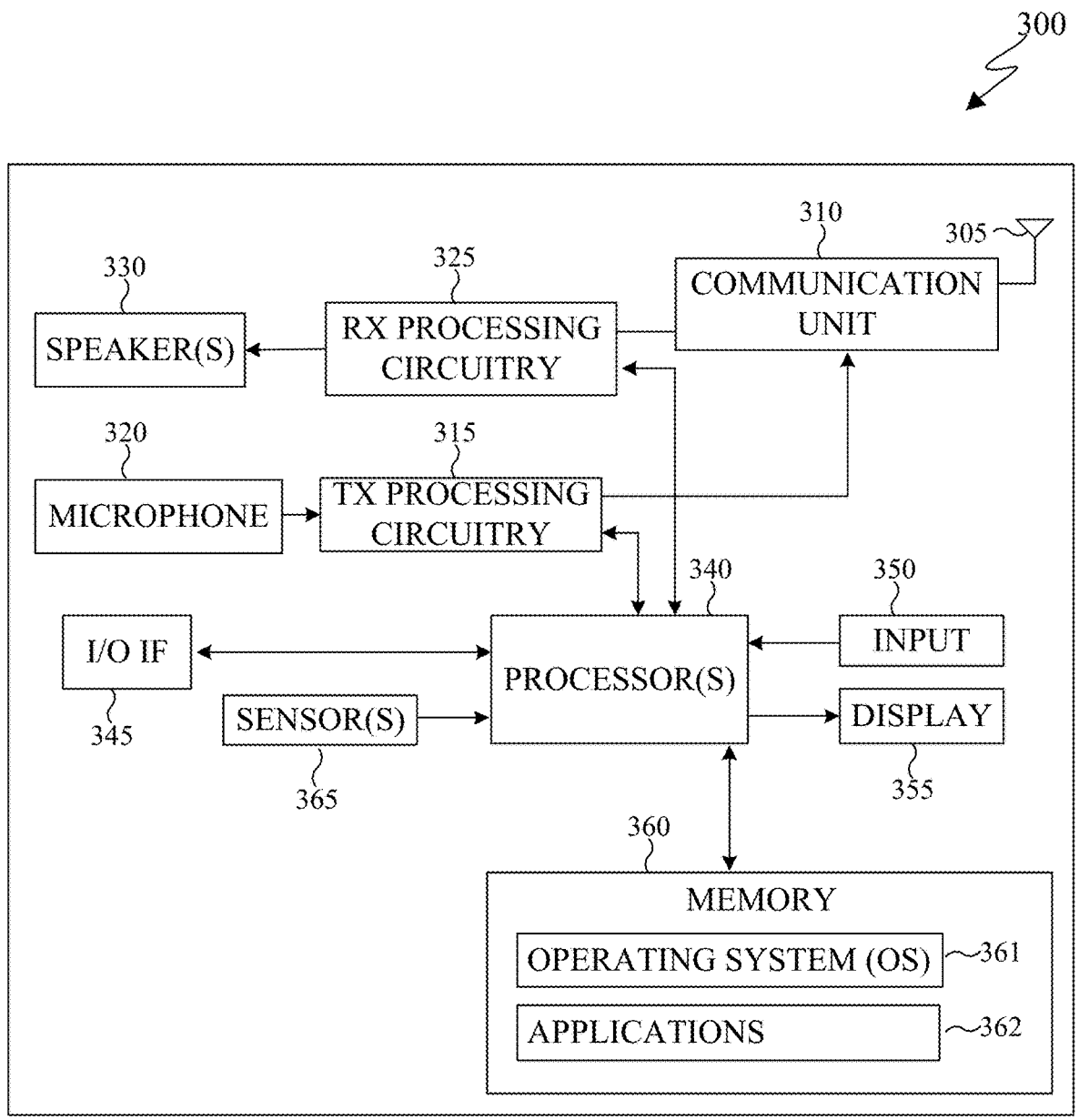

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers and components that act as a single pool of seamless resources, a cloud-based server, and the like. The server 200 can be accessed by one or more of the client devices 106-114 of FIG. 1.

As shown in FIG. 2, the server 200 includes a bus system 205 that supports communication between at least one processor 210, at least one storage device 215, at least one communication interface 220, and at least one input/output (I/O) unit 225. The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102. The communication interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. For example, in some embodiments, the electronic device 300 may implement or represent a virtual assistant device that can receive a natural language input such as a verbal utterance, derive meaning from the input, and perform an action based on the derived meaning. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The communication unit 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing natural language processing and the like. The processor 340 can move data into or out of the memory 360 as required by an executing process. In some embodiments, the processor 340 is configured to execute a plurality of applications 362 based on the OS 361 or in response to signals received from external source(s) or an operator. Example, applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
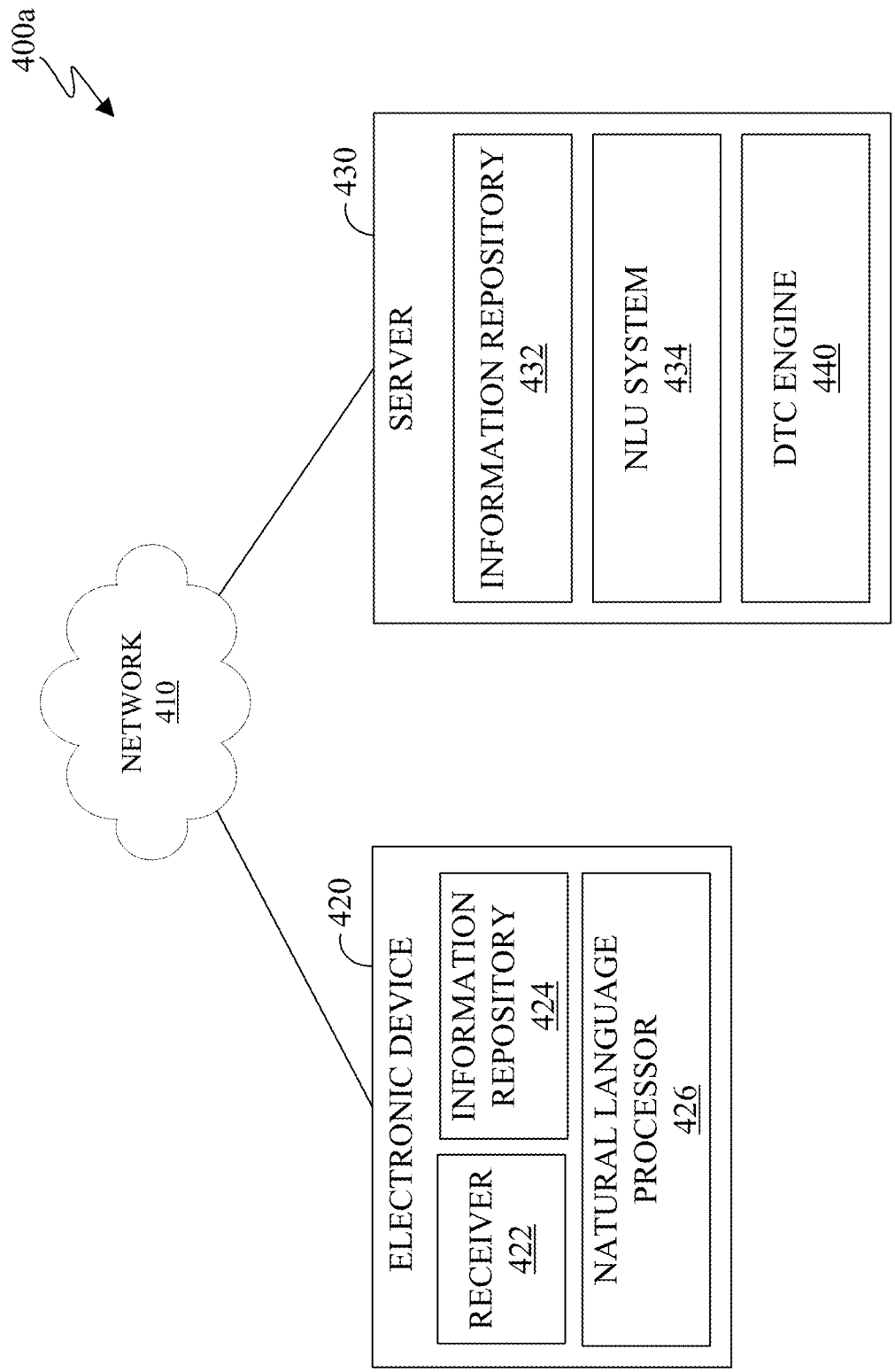
FIG. 4A illustrates an example environment architecture in accordance with an embodiment of this disclosure.

FIG. 4A illustrates an example environment architecture 400a in accordance with an embodiment of this disclosure. As shown in FIG. 4A, the environment architecture 400a includes a server 430 and an electronic device 420 in communication over a network 410. The network 410 can be the same as or similar to the network 102 of FIG. 1. In some embodiments, the network 410 represents a "cloud" of computers interconnected by one or more networks, where the network is a computing system utilizing clustered computers and components that act as a single pool of seamless resources when accessed. Also, in some embodiments, the network 410 is connected with one or more servers (such as the server 104 of FIG. 1, the server 200 of FIG. 2, and/or the server 430), one or more electronic devices (such as the client devices 106-114 of FIG. 1, the electronic device 300 of FIG. 3, and/or the electronic device 420). Further, in some embodiments, the network 410 can be connected to an information repository (external to that of the electronic device 420 and the server 430), such as a database, that contains look-up tables and information pertaining to various clusters of slots that are associated with support modules (similar to an NLU ontology 436 of FIGS. 4B and 4C described below).

In some embodiments, the electronic device 420 can represent one of the client devices 106-114 of FIG. 1, the electronic device 300 of FIG. 3, a virtual assistant device, or other suitable device. In other embodiments, a portion of the components included in the electronic device 420 can be included in different devices, such as the server 430, multiple servers 104, 200, or 430, multiple devices 106-114, 300, or 420, or other combinations of different devices.

In this example, the electronic device 420 includes a receiver 422, an information repository 424, and a natural language processor 426. The electronic device 420 can receive a natural language input through the receiver 422. In some embodiments, the natural language input represents a received verbal utterance, a typed input, or the like. The received input can include a command from a user that instructs the electronic device 420 to perform a particular action. The receiver 422 represents any suitable component for receiving a natural language input. For example, if the natural language input is a verbal utterance, the receiver can include the microphone 320 of FIG. 3. Example types of microphones that can be used here include a dynamic microphone, a condenser microphone, a piezoelectric microphone, or the like. The receiver 422 generally operates to receive sound waves (such as voice data) and convert the sound waves into electrical signals. The receiver 422 can also receive verbal utterances from another electronic device. For instance, the other electronic device can include a speaker, such as the speaker 330 of FIG. 3, which propagates verbal utterances. As another example, the receiver 422 can receive wired or wireless signals that include a natural language input, such as when the receiver 422 includes the communication unit 310 of FIG. 3. As yet another example, the receiver 422 can include an I/O interface (such as the I/O interface 345 of FIG. 3) connected to a keyboard that receives typed inputs from a user.

The information repository 424 represents any suitable structure(s) capable of storing and facilitating retrieval of information (such as data, program code, or other suitable information on a temporary or permanent basis). The information repository 424 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc. In some embodiments, the information repository 424 includes one or more clusters. Clusters are described in greater detail below with respect to FIG. 5. The information repository 424 can also include various user biographical information, such as age, gender, current location, one or more interests, and the like. The natural language processor 426 can use the biographical information when determining additional information related to a received input.

The natural language processor 426 derives the intent of the natural language input. In this way, the natural language processor 426 allows a user to interact with the electronic device 420 through a natural language input received by the receiver 422. For example, the natural language processor 426 can interpret a received natural language input from the receiver 422. After interpreting the received natural language input, the natural language processor 426 can then provide access to one or more clusters (stored locally in the information repository 424 or remotely, such as in the server 430) to search for slots associated with the received natural language input. The received slots provide additional information associated with the natural language input. The additional information enables the natural language processor 426 to extrapolate information associated with the received input but not explicitly included in the received input.

In some embodiments, the server 430 can represent the server 104 of FIG. 1 or the server 200 of FIG. 2. In other embodiments, a portion of the components included in the server 430 can be included in different devices, such as multiple servers 104 or 200, multiple client devices 106-114, multiple electronic devices 300, or a combination of different devices. The server 430 can represent one or more local servers, one or more natural language processing servers, one or more speech recognition servers, one or more dynamic clustering servers, or the like. The server 430 can be a web server, a server computer such as a management server, or any other electronic computing system capable of sending and receiving data. The server 430 can include an information repository 432, an NLU system 434, and a DTC engine 440

The information repository 432 represents any suitable structure(s) capable of storing and facilitating retrieval of information (such as data, program code, or other suitable information on a temporary or permanent basis). The information repository 432 can represent the memory 230 of FIG. 2, possibly along with the persistent storage 235 of FIG. 2. The memory can be RAM or any other suitable volatile or non-volatile storage device(s), while persistent storage can contain one or more components or devices supporting longer-term storage of data, such as a ROM, hard drive, Flash memory, or optical disc.

In some embodiments, the information repository 432 includes support modules (similar to the NLU ontology 436 of FIGS. 4B and 4C described below). The NLU ontologies can be associated with the NLU system 434. In other embodiments, the NLU ontologies can be located in a remotely-located information repository, such as in a cloud or remote database. In some embodiments, the information repository 432 includes formation groups as well as clusters. A formation group is an aggregation of slots but is not yet qualified to be converted to a cluster. A cluster represents a grouping of slots that are indicated trending. In some embodiments, the slots can be used by the natural language processor 426 to derive relevant information associated with a received natural language input. In some embodiments, the slots can be used to infer information from a received natural language input.

The NLU system 434 enables computing devices, such as the electronic device 420, to understand and extract information from a natural language input via written or spoken language. The NLU system 434 is closely associated with the natural language processor 426 of the electronic device 420. For example, when the electronic device 420 receives a natural language input such as a verbal utterance via the receiver 422, the natural language processor 426 processes the received input. The NLU system 434 can work in tandem with the natural language processor 426 to extract relevant information from the input (such as the domain and slots), identify the request from the user, and either perform the request or instruct the electronic device 420 to perform the request using another application or program. For instance, the NLU system 434 can extract relevant information contained within the natural language input and then supply this information to another application, program, or system for purposes such as booking flight reservations, finding documents, summarizing text, and the like. In some embodiments, the NLU system 434 can access one or more support modules, similar to the NLU ontology 436 discussed below with respect to FIGS. 4B and 4C. The NLU system 434 can utilize NLU ontologies that include clusters, categories, and relationships between slots representing information in order to better understand the natural language input. In some embodiments, the NLU system 434 is located on one or more servers that are external and separate from the server 430.

The DTC engine 440 can form the clusters and the formation groups, as well as infer additional information from a received keyword based on the clusters. For example, the natural language processor 426, the NLU system 434, or both can provide an input to the DTC engine 440, and the DTC engine 440 can infer additional information from a cluster. The NLU system 434 can provide natural language inputs and extracted slots that were successfully fulfilled and executed to the DTC engine 440. The DTC engine 440 can analyze the natural language inputs and extracted slots and create new clusters that can be associated with existing NLU ontologies. Additionally, the DTC engine 440 can assist the NLU system 434 when interpreting a natural language input and performing the command included in the input, such as by inferring additional information from the clusters created by the DTC engine 440.

In some instances, the DTC engine 440 monitors large quantities of multivariate data in order to detect and identify events that are currently trending. For example, the DTC engine 440 can scan natural language inputs, such as those received via the receiver 422, to identify those natural language inputs that are tagged as being successfully executed or fulfilled. The DTC engine 440 can then refer to intent and slot information extracted from the natural language inputs by the NLU system 434. In some embodiments, the DTC engine 440 can also extract keywords from the natural language inputs that were previously executed successfully. Based on the extracted information, the DTC engine 440 can detect patterns in the usage of the inputs and identify keywords with a high frequency as a trending event. When a trending event is identified, the DTC engine 440 forms a cluster of slots associated with the event keyword for inferring additional information from an inquiry via the NLU system 434. In some embodiments, the DTC engine 440 can extract relevant associated slots after a natural language input passes through an NLU system.

Figure 6A:
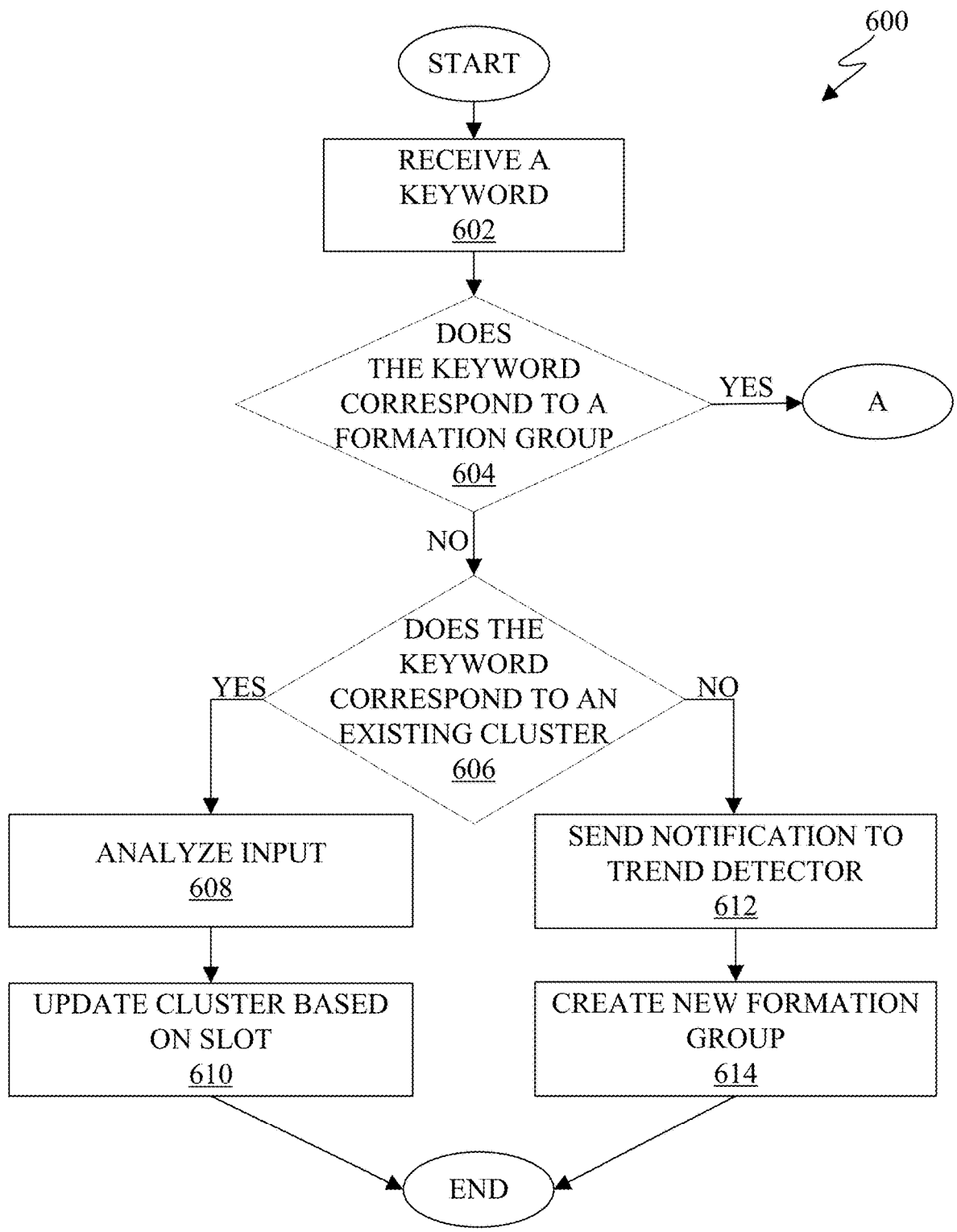
FIGS. 6A and 6B illustrate an example method for forming trend clusters in accordance with an embodiment of this disclosure.
Figure 6B:
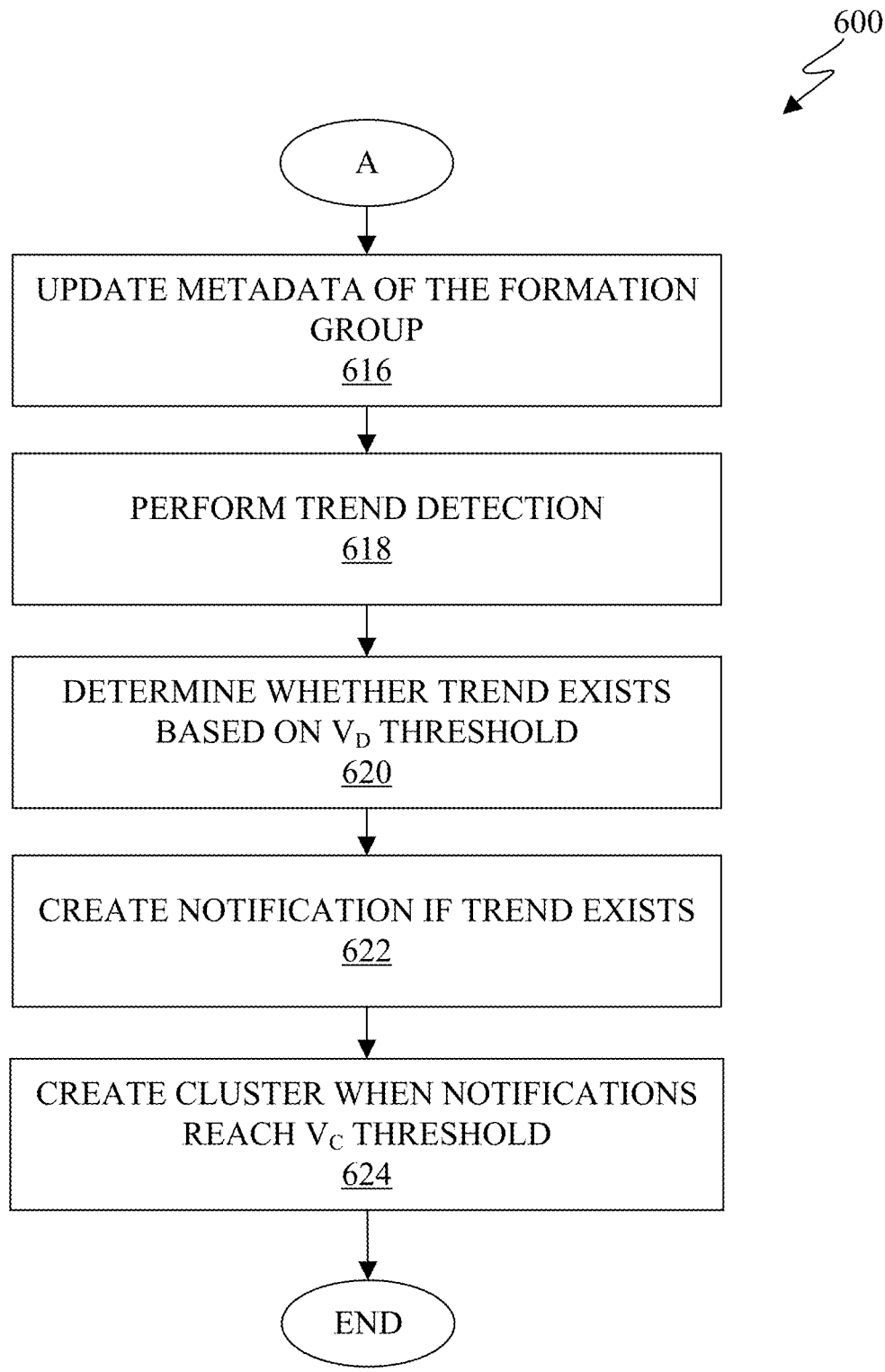

In some embodiments, the DTC engine 440 can be implemented as an extension to an existing NLU ontology, as the DTC engine 440 can detect patterns in natural language inputs to identify event keywords that are used with high frequency. The DTC engine 440 can create temporary trends to fulfil user interactions regardless of any particular domain based around primary trending keywords. In some embodiments, the DTC engine 440 can detect keywords and events that are trending based on usage patterns or manual inputs. The DTC engine 440 can then create temporary clusters of slots associated with a keyword or event. The DTC engine 440 can also terminate a cluster based on a decrease in the trending frequency of the topic or a manual trigger. FIGS. 4B, 6A, and 6B below describe example creations of clusters.

The DTC engine 440 uses created clusters to cross-reference a received natural language input in order to automatically complete slots in related domains. Once a cluster is created, the DTC engine 440 can also link the keywords of a received natural language input to an event cluster in order to infer slots associated with the received input. The inferred slots can be used to derive and execute the intent of a user, even if not explicitly stated in the received natural language input. For example, if a natural language input includes the phrase "purchase tickets to the concert," the inferred slots can identify which concert the user was referring to, the date and time of the concert, and any other information that is included in the cluster. Information regarding ticket prices can then be provided to the user, without the need to ask the user "which concert," "what date," "what location," and the like.

Figure 7:
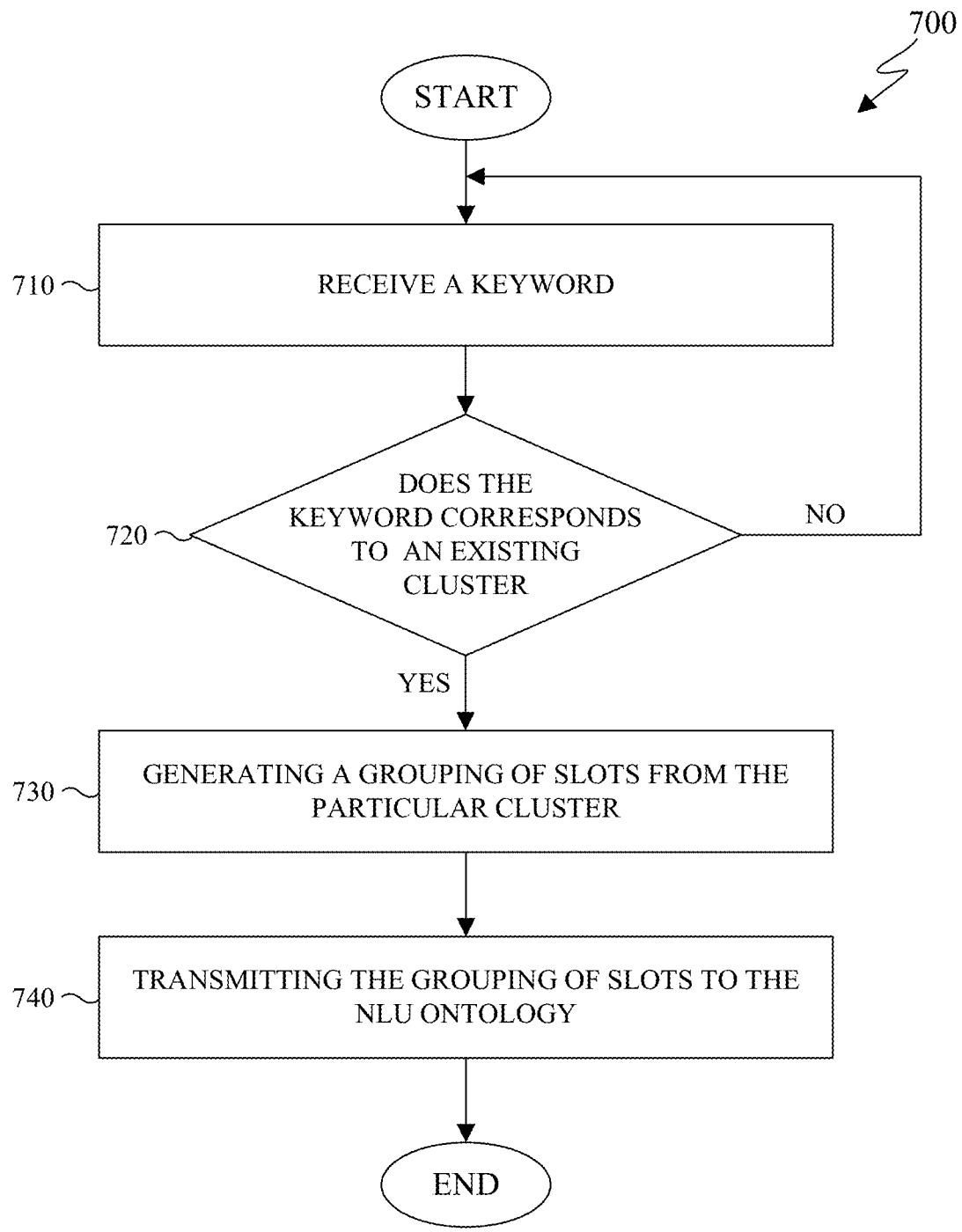
FIG. 7 illustrates an example method for providing slot information from an existing cluster in accordance with an embodiment of this disclosure.

The DTC engine 440 can also operate to extend NLU ontologies. For example, the DTC engine 440 can monitor news sources to identify trending news and provide notifications for a user. As another example, the DTC engine 440 can identify popular trending topics. For instance, a cluster can be created concerning a particular concert that is occurring in San Jose, Calif. on March 8 at 7:00 pm. If a virtual assistant device receives natural language input requesting "book a flight to the concert in San Jose," the DTC engine 440 can associate the natural language input with the cluster concerning the concert. When the DTC engine 440 associates the natural language input with the cluster concerning the concert, the DTC engine 440 links the parameters of the concert and books a flight with minimal user input. The DTC engine 440 can also prompt the natural language processor 426 to ask if the user needs other services associated with travel to/from the concert, such as a car rental, a hotel, a restaurant, and the like. FIGS. 4C and 7, discussed below, describe example processes of the DTC engine 440 for deriving inferences from a received natural language input from previously-created clusters.

Although FIG. 4A illustrates one example of an environment architecture 400a, various changes can be made to FIG. 4A. For example, any other suitable arrangement of the natural language processor 426, the DTC engine 440, or both could be used in the environment architecture 400a.

Figure 4B:
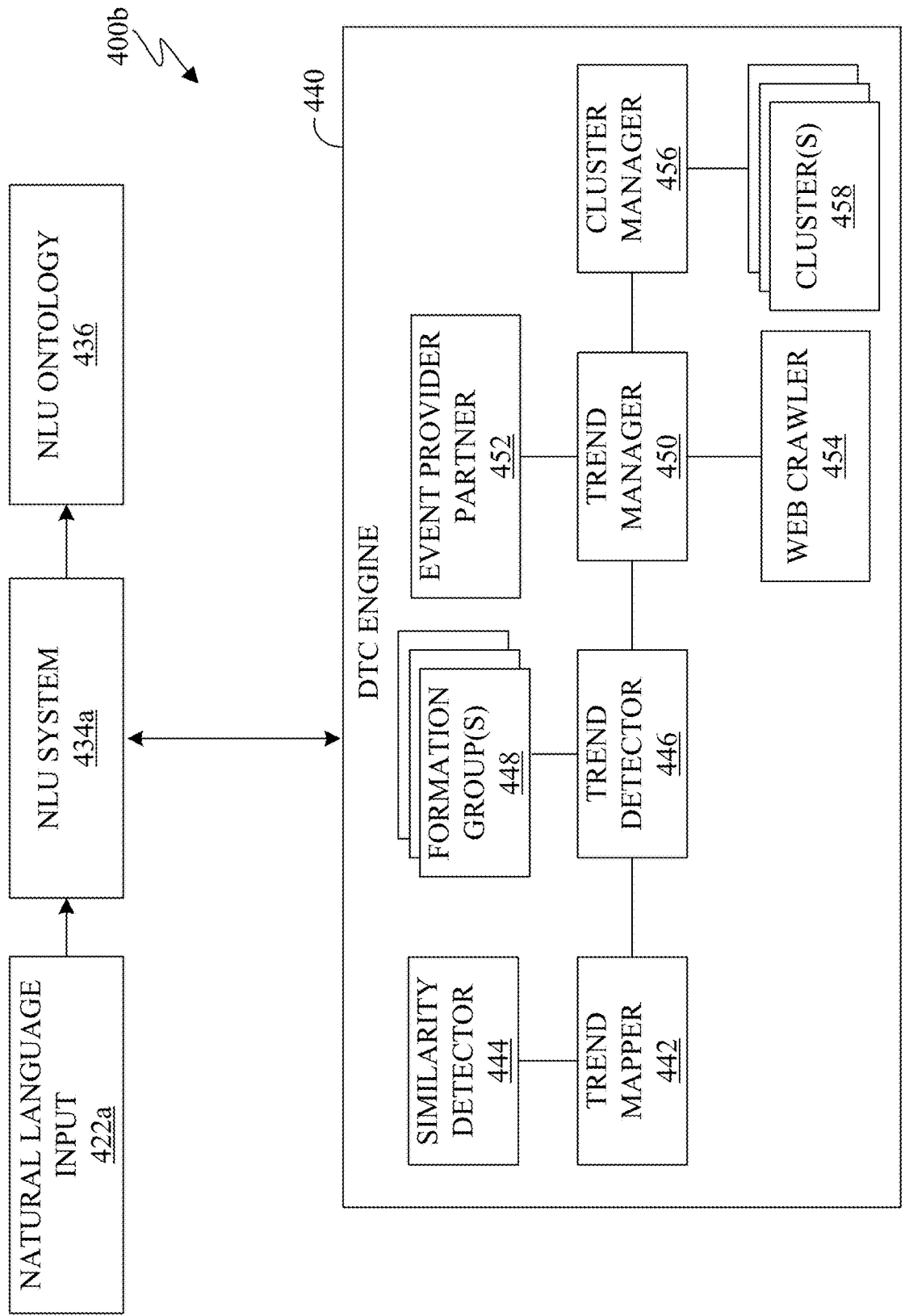
FIG. 4B illustrates an example process for forming trend clusters in accordance with an embodiment of this disclosure.

FIG. 4B illustrates an example process 400b for forming trend clusters in accordance with an embodiment of this disclosure. The process 400b here involves the use of a natural language input 422a, an NLU system 434a, an NLU ontology 436, and the DTC engine 440 of FIG. 4A. The natural language input 422a represents an input that is received by the receiver 422 of FIG. 4A. The natural language input 422a can be a verbal utterance, a typed input, or any other type of natural language input that a user directs to the electronic device 420.

The NLU system 434a can be the same as or similar to the NLU system 434 of FIG. 4A. The NLU system 434a can receive the natural language input 422a and identify a domain of the input, the intent of the input, and one or more slots of the input in order to derive an executable action from the natural language input 422a. In order to derive the executable action, the NLU system 434a can access one or more supporting modules, such as the NLU ontology 436. The NLU ontology 436 represents a set of concepts and categories and their corresponding relationships in a particular subject area or domain. Upon deriving the natural language input, the NLU system 434a can instruct the electronic device 420 to execute a command included in the natural language input 422a.

The NLU system 434a provides the DTC engine 440 with utterances or other information included in the natural language input 422a that are tagged as being successfully executed or fulfilled. The DTC engine 440 can scan the information provided by the NLU system 434a, the extracted intents, and slots from the given information.

When the DTC engine 440 receives a new keyword or event with multiple slots, the DTC engine 440 can place the slot(s) into an existing formation group or create a new formation group. For example, a formation group can be associated with a particular keyword, and any slot that is related to the particular keyword is included in that formation group. The DTC engine 440 can also find other related slots, and those related slots are included in the same formation group. When the DTC engine 440 detects a first threshold (such as a usage frequency of the keywords or slot update frequency), a notification is generated. When a second threshold is reached (such as a higher usage frequency of the keyword or a higher slot update frequency), the formation group is turned into a cluster. In this example, the DTC engine 440 includes a trend mapper 442, a similarity detector 444, a trend detector 446, formation groups 448, a trend manager 450, an event provider partner 452, a web crawler 454, a cluster manager 456, and clusters 458.

In some embodiments, the DTC engine 440 extracts slots based on information received from the NLU system 434a. In other embodiments, the DTC engine 440 receives the slots themselves from the NLU system 434a. For each natural language input and slot, the trend mapper 442 identifies that a keyword is a trend. The trend mapper 442 analyzes each extracted keyword or natural language input using the similarity detector 444 to determine whether the slot corresponds to any keyword associated with one of the formation groups 448 and notifies the trend detector 446 of the result. The similarity detector 444 uses one or more similarity algorithms to identify whether the extracted keyword is similar to a keyword included in one of the formation groups 448. Example algorithms that could be used here may include Latent Dirichlet Allocation (LDA), Mutual Similarity Scores Using N-Grams, Singular Value Decomposition (SVD), Nearest Neighbor, Simple Cosine Similarity, and the like. Each formation group 448 includes a grouping of slots and the associated keyword, which are not yet qualified as one of the clusters 458. Since the trend mapper 442 analyzes each natural language input or extracted slot, the formation groups 448 can store the information on a temporary basis in order for the trend detector 446 to identify whether one of the formation groups is trending beyond a threshold such that the formation group becomes one of the clusters 458.

If a new keyword is similar to one of the existing formation groups 448 and the information that the slot represents is not included in the formation group, the trend detector 446 adds the slot to the corresponding formation group. Thereafter, the trend detector 446 performs a trend detection of that formation group to identify whether that formation group is currently trending. In some embodiments, the results of the similarity algorithm are mapped to the respective formation group. The trend detector 446 can use any suitable detection algorithm(s) to identify whether the frequency that keywords are identified or the frequency that slots are added to a particular formation group 448 indicates that the particular formation group is trending. Example algorithms that could be used here may include Burst Detection or Spline Regression, Burst Detection or Spline Regression With a Smoothing Mechanism, Non-Parametric Correlation Coefficient (Kendrall), Least Square Regression (LOESS), Multivariate Bayesian Scan Statistic (MBSS), Hybrid N-Gram or M/DL Models based on language syntax labeled as features, and the like.

In some embodiments, the trend detector 446 classifies trends based on a threshold $V_D$. For example, when the frequency that keywords are identified or the frequency that slots are updated in a particular formation group reaches the threshold $V_D$, the trend detector 446 notifies the trend manager 450. The threshold $V_D$ that the trend detector 446 uses to indicate one of the formation groups is trending can be established in any suitable manner, such as by using a heuristic model or an algorithm. For example, a Linear Matrix Inequality (LMI) can be used to indicate the threshold. In some embodiments, the threshold $V_D$ is treated as an optimization problem. The threshold $V_D$ can also be manually curated. In some embodiments, the trend detector 446 can also determine whether one of the formation groups 448 is stagnant (such that new slots are not added to the formation group 448) and thereafter delete the formation group.

If a new keyword is not similar to one of the formation groups 448, the trend manager 450 compares the keyword to the clusters 458. If the keyword does not correspond to one of the clusters 458, the trend manager 450 notifies the trend detector 446 to create a new formation group 448 for the keyword. Thereafter, the trend detector 446 creates a new formation group 448, and the trend detector 446 places the keyword into the newly-created formation group. Alternatively, if the slot corresponds to one of the clusters 458, the trend manager 450 analyzes the natural language input for new associative slots that are not part of the particular cluster. If the natural language input includes any new slots, those slots are added to the particular cluster. If, however the slots extracted from the natural language input are already included in the cluster (such that the information already exists in the cluster), the extracted slots are not included in the cluster.

The trend manager 450 controls the lifecycle of each cluster 458. For example, the trend manager 450 can operate based on a threshold $V_C$. The threshold $V_C$ can be triggered when the trend manager 450 receives notifications that a particular formation group 448 is trending. For example, the threshold $V_C$ can be triggered based on the frequency that new notifications are received with respect to a particular keyword of a formation group 448. The trend manager 450 then instructs the cluster manager 456 to create a cluster 458 based on the formation group 448. That is, the trend detector 446 determines a particular formation group is trending based on the threshold $V_D$ and notifies the trend manager 450. When the notifications the trend manager 450 receives reaches the threshold $V_C$, the trend manager 450 instructs the cluster manager 456 to create a cluster 458 corresponding to the slots of the formation group 448. In some embodiments, the formation group 448 is converted to a cluster 458. In other embodiments, a cluster 458 is created and includes the slots from the formation group 448, and the trend detector 446 deletes the formation group 448. The two thresholds $V_C$ and $V_D$ are a software architecture optimization, which enables the DTC engine 440 to optimize the processing for the similarity detection of the similarity detector 444 and the trend detection of the trend detector 446 by separation of concerns.

In some embodiments, the trend manager 450 can detect a drop in the trend of natural language inputs regarding a keyword associated with a cluster 458. If a drop is detected, the trend manager 450 can trigger the removal of a cluster 458. In some embodiments, the trend manager 450 can detect a drop in the trend based on an input from the trend detector 446. In other embodiments, the trend manager 450 can detect a drop in the trend based on a timed heuristic update threshold associated with a particular cluster 458. In yet another embodiment, the trend manager 450 can detect a drop in the trend based on an input from the trend detector 446 and on a timed heuristic update threshold associated with a particular cluster 458. If the trend manager 450 determines that a particular cluster 458 is no longer trending, the trend manager 450 instructs the cluster manager 456 to remove the particular cluster 458.

In some embodiments, the threshold $V_D$ is based on the frequency of keywords and associated slots detected for a particular formation group 448. The frequency can be the number of times the keyword associated with a formation group is detected by the trend mapper 442 or the number of slots that are updated to a formation group 448 over a specified period of time. When the trend detector 446 reaches the threshold $V_D$, the trend detector 446 sends a notification to the trend manager 450. In some embodiments, the threshold $V_C$ is reached when the trend manager 450 receives a certain number of notifications based on the trend detector 446 reaching the threshold $V_D$.

The cluster manager 456 creates clusters 458 as indicated by the trend manager 450. The cluster manager 456 also manages the clusters 458. For example, if a new slot is to be added to an existing cluster 458, the cluster manager 456 adds the slot to the particular cluster. The cluster manager 456 also deletes clusters 458 as indicated by the trend manager 450.

The event provider partner 452 ensures that when a trend is detected by the trend detector 446, the trend is not lost by the automated threshold calculations. That is, the event provider partner 452 ensures that a trending topic above a certain threshold $V_C$ is triggered by manually setting the threshold Vc. In some embodiments, the event provider partner 452 provides a cluster 458 that includes one or more slots to the trend manager 450. The trend manager 450 can then instruct the cluster manager 456 to add the provided cluster 458.

In some embodiments, the web crawler 454 systematically browses the Internet in search of slots for trending topics. If the trend manager 450 identifies a topic, the web crawler 454 can search for and discover slot information related to the topic. Thereafter, the DTC engine 440 can extract slots from the discovered information and provide the extracted slots to the trend detector 446 (similar to when the DTC engine 440 provides a new natural language input to the trend mapper 442 in order to perform similarity detection to formation groups as discussed above). In other embodiments, the web crawler 454 systematically browses the Internet in search of additional slots related to existing clusters 458. For example, if a cluster 458 is related to a particular concert, the web crawler 454 searches the Internet for additional information related to the concert. The trend manager 450 can extract slots from information that is found by the web crawler 454. Each slot can then be analyzed to identify whether the information the slot represents is included in the particular cluster 458. If the slot is not included in the cluster, the cluster manager 456 adds the slot to the respective cluster 458. Note, however, that the web crawler 454 can be omitted from the DTC engine 440. In some embodiments, a gazetteer tracks all trends and clusters.

In other embodiments, the DTC engine 440 builds the NLU ontology 436 based on the clusters 458.

Figure 4C:
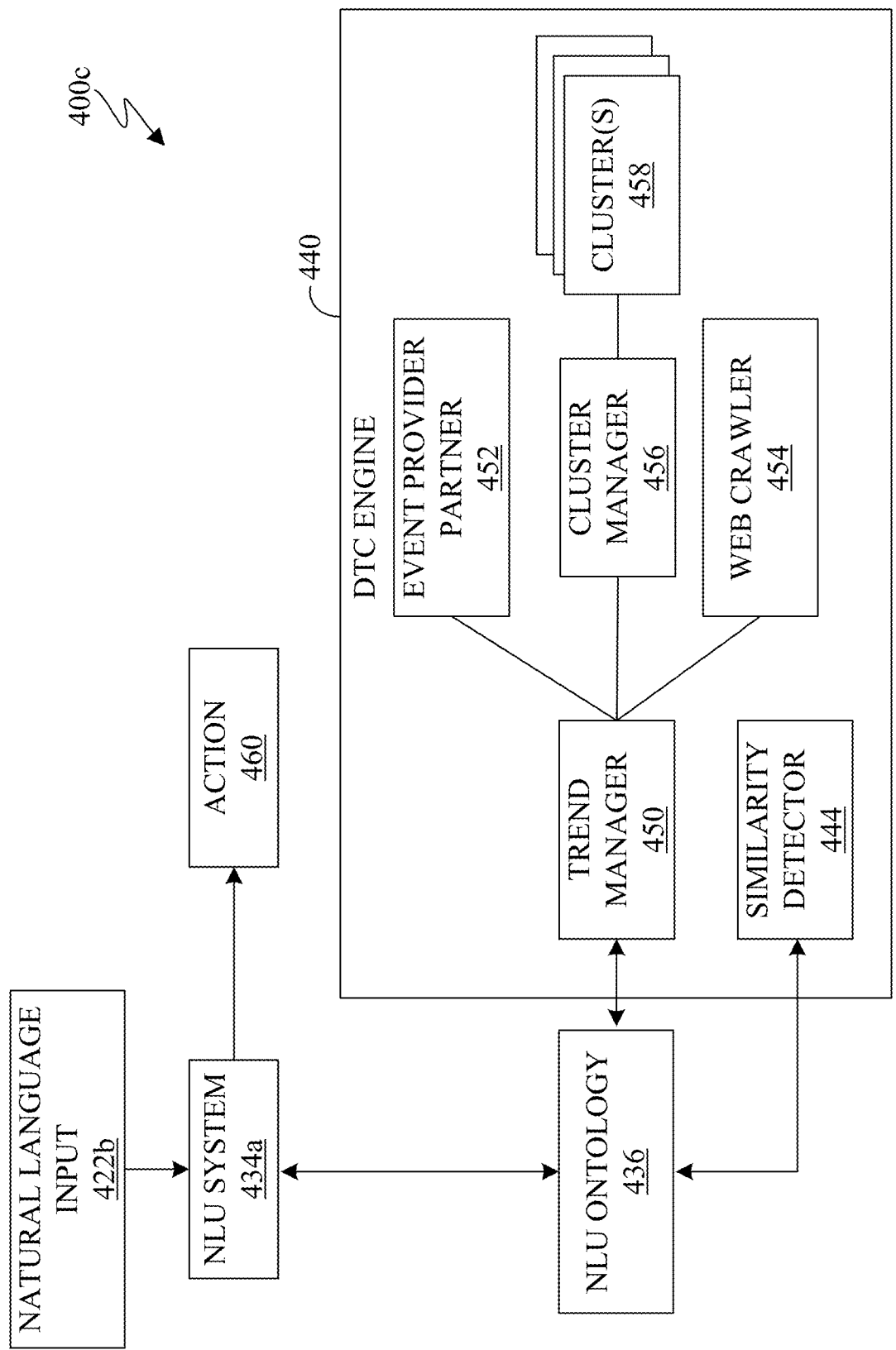
FIG. 4C illustrates an example process for providing slot information from an existing cluster in accordance with an embodiment of this disclosure.

FIG. 4C illustrates an example process 400c for providing slot information from an existing cluster in accordance with an embodiment of this disclosure. The process 400c here involves the use of a natural language input 422b and the NLU system 434a, NLU ontology 436, and DTC engine 440 of FIG. 4B. The natural language input 422b can be a verbal utterance, a typed input, or any other type of natural language input that a user directs to the electronic device 420.

The NLU system 434a receives the natural language input 422b and identifies the domain of the input, the intent of the input, and one or more slots of the input in order to derive an executable action from the natural language input 422b. In order to derive the executable action, the NLU system 434a can access one or more support modules, such as the NLU ontology 436. Upon deriving the natural language input, the NLU system 434a can instruct the electronic device 420 to execute an action 460 based on the natural language input 422a.

The NLU system 434a can use the NLU ontology 436 to resolve the slots of the natural language input 422b. When the NLU system 434a refers to the NLU ontology 436 to resolve the slots of the natural language input 422b, the NLU ontology 436 can access the clusters 458 via the trend manager 450 of the DTC engine 440 to find inferred slots. For example, the NLU ontology 436 can access the DTC engine 440 to resolve the slots or parameters associated with the natural language input 422b.

In some embodiments, the NLU ontology 436 can receive the natural language input 422b via the NLU system 434a. The NLU ontology 436 can then send the natural language input, extracted slots or both to the DTC engine 440 for verification and resolution of the slots. In particular embodiments, the NLU ontology 436 can send the natural language input to the DTC engine 440 to identify keywords via the similarity detector 444 and the trend mapper 442. For example, the similarity detector 444 and the trend mapper 442 can search the natural language input 422b for keywords. The trend manager 450 can search the clusters 458 to find a cluster that is similar to the detected keywords. If the trend manager 450 identifies that any of the received keywords is similar to a trending keyword relating to one of the clusters 458 has been formed around, the trend manager 450 returns a list of possible slots from the cluster 458 that the keyword or trend is associated with. The list of associated slots can be used by the NLU system 434a to resolve the inferred intent of the natural language input 422b.

As a result, if the natural language input 422b involves a trending keyword, the NLU system 434a can use the trending keyword as a proxy substitution for other slots required by the domain to execute the action 460. Therefore, the NLU system 434a can gather more information related to the natural language input 422b to provide a more intelligent response to the user, as well as perform actions without the need for the user to specify every detail. For example, if the natural language input 422b is associated with a particular event that one of the clusters 458 describes, the trend manager 450 can provide a list to the NLU ontology 436 of all relevant information included in the cluster 458, such as date, time, location, and the like.

Although FIGS. 4B and 4C illustrate examples of the DTC engine 440 creating clusters and inferring slots, various changes can be made to FIGS. 4B and 4C. For example, any other suitable arrangement of the trend mapper 442, similarity detector 444, trend detector 446, trend manager 450, cluster manager 456, formation groups 448, clusters 458, event provider partner 452, and web crawler 454 could be used in an electronic device 420.

Figure 5:
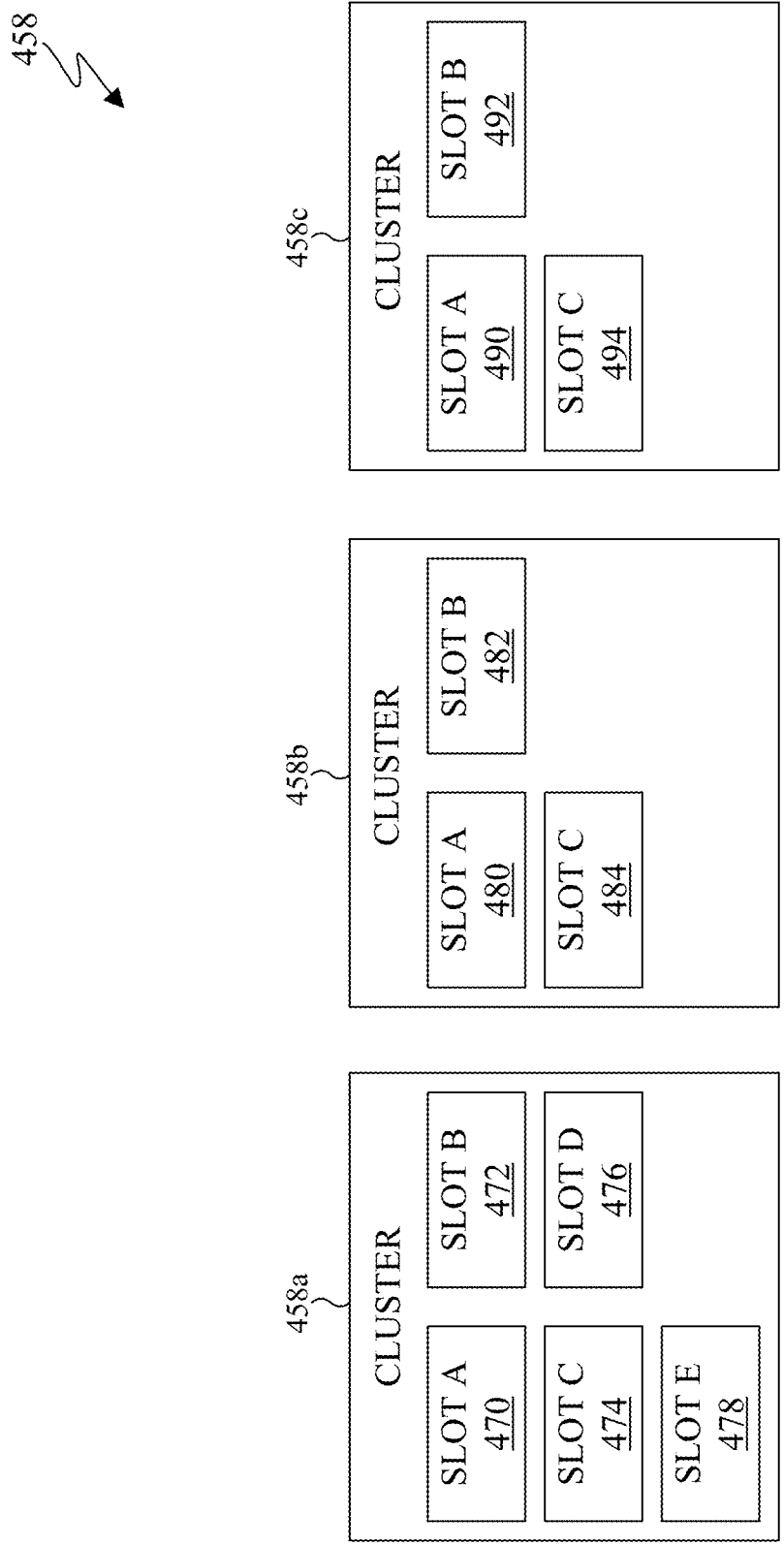
FIG. 5 illustrates an example cluster in accordance with an embodiment of this disclosure.

FIG. 5 illustrates example clusters 458a-458c in accordance with an embodiment of this disclosure. The clusters 458a-458c are for illustration only. Other embodiments can be used without departing from the scope of this disclosure. As shown here, the clusters 458a-458c represent three example clusters of the clusters 458 in FIGS. 4B and 4C. Each of these clusters 458a-458c represents a trending event or topic as identified by the trend manager 450 of FIGS. 4B and 4C.

As particular examples, the cluster 458a may represent a cluster of slots regarding a live music event, such as a concert of a certain band. The cluster 458a includes five slots 470, 472, 474, 476, and 478. The slot 470 may include location information of the music event, such as geographic information like city, state, country, name of a theater or venue, and an address of the concert. The slot 472 may include ticket information of the music event, such as ticket prices at different positions within the theater or venue. The slot 474 may include the date of the concert. The slot 476 may include band information, such as the name of the band and individual artists in the band. The slot 478 may include names of albums that the band has recorded and names of songs that the band has recorded. In some embodiments, any of the slots 470-478 can represent multiple slots, where each slot represents a portion of the associated information. For example, the slot 470 can be separated into multiple slots, with different slots including the city, state, country, theater/venue name, address, and the like.

The cluster 458b may represent a cluster of slots regarding a live sporting event, such as a football game. The cluster 458b includes three slots 480, 482, and 484. The slot 480 may include location information of the sporting event, such as the city, state, country, name of arena, and address of the arena. The slot 472 may include ticket information of the sport event, such as ticket prices at different positions within the arena. The slot 484 may include name information, such as the name of the arena, the names of the sports teams, and the like. Again, in some embodiments, any of the slots 480-484 can represent multiple slots, where each slot represents a portion of the associated information.

The cluster 458c may represent a cluster of slots regarding a news event. The cluster 458c includes three slots 490, 492, and 494. The news event can be a trending topic, such as a natural disaster. The slot 490 may include the location of the news event, such as the area or areas affected by a natural disaster. The slot 492 may include an information resource identifier (URI) associated with a news article or other information about the trending topic. The slot 494 may include the date of the natural disaster. Once again, in some embodiments, any of the slots 490-494 can represent multiple slots, where each slot represents a portion of the associated information.

Although FIG. 5 illustrates one example of clusters 458, various changes can be made to FIG. 5. For example, any number of clusters can be included in the clusters 458, and any number of slots can be included in each of the clusters 458.

FIGS. 6A and 6B illustrate an example method 600 for forming trend clusters in accordance with an embodiment of this disclosure. The method 600 may be performed by the server 104 or any of the client devices 106-114 of FIG. 1, the server 200 of FIG. 2, the electronic device 300 of FIG. 3, the electronic device 420 or the server 430 of FIG. 4A, or any other suitable device or system. For ease of explanation, the method 600 is described as being performed by the DTC engine 440 of FIGS. 4A, 4B, and 4C.

In step 602, the DTC engine 440 receives a keyword. The keyword can be extracted from a natural language input. In some embodiments, the DTC engine 440 receives the natural language input and extracts one or more relevant slots from the input. In other embodiments, the NLU system 434 receives the natural language input, extracts one or more relevant slots from the input, and provides the slots to the DTC engine 440.

In step 604, the DTC engine 440 determines whether the keyword corresponds to one of the existing formation groups. For example, the keyword may correspond to an existing formation group when the DTC engine 440 determines that the keyword and slot are similar to the content of an existing formation group 448. In some embodiments, the trend mapper 442 uses the similarity detector 444 to determine whether the keyword corresponds to one of the existing formation groups 448. In other embodiments, the DTC engine 440 uses an algorithm to identify whether the slot is similar to any of the formation groups 448.

If the keyword is not similar to any of the formation groups, in step 606, the DTC engine 440 determines if the keyword corresponds to one of the existing clusters. For example, the keyword may correspond to an existing cluster when the DTC engine 440 determines that the keyword is similar to a keyword of an existing cluster 458. If the keyword is similar to an existing cluster, in step 608, the DTC engine 440 analyzes the information of the received keyword or slot and compares the information to the particular cluster. For example, upon identifying one of the clusters that the received keyword is related to, the DTC engine 440 may compare the slots within the cluster to the received slot. If the received slot is similar to any of the existing slots within the cluster, the received slot is abandoned, and the DTC engine 440 waits for the next slot or natural language input to be received (such as by returning to step 602). In step 610, if the information of the received slot is not included in any of the slots within the cluster, the DTC engine 440 updates the cluster by adding the received slot into the cluster such that the new information of the received slot augments the information already included in the cluster. After the slot is added to the cluster, the DTC engine 440 waits for the next slot or natural language input to be received (such as by returning to step 602). In some embodiments, in step 608 the DTC engine 440 compares the natural language input that the received slot 602 originated from to the particular cluster in order to find any new associated slots from the natural language input that are not included in the particular cluster. When the DTC engine 440 identifies any new associated slots, in step 610 the DTC engine 440 updates the cluster by adding the identified new associated slots to further augment the information already included in the cluster.

If the slot is not similar to an existing cluster at step 606, in step 612, the trend manager 450 sends a notification to the trend detector 446. In step 614, the trend detector 446 creates a new formation group, and the slot is stored in the new formation group. Note that step 612 can be omitted such that (after step 606) the DTC engine 440 creates a new formation group for the slot in step 614. After the slot is stored and associated with the formation group, the DTC engine 440 waits for the next slot or natural language input to be received (such as by returning to step 602).

If the keyword is similar to one of the existing formation groups in step 604, in step 616, the DTC engine 440 updates the keyword information in the metadata of the formation group that the keyword is found to be most similar by the similarity detector 444. In step 618, the DTC engine 440 performs trend detection with respect to the formation group that the latest keyword information was updated to. For example, the DTC engine 440 can instruct the trend detector 446 to identify whether a trend is detected based on the frequency that new slots are updated to the formation group or based on the current keyword information was updated to. In step 620, the trend detector 446 of the DTC engine 440 determines whether a trend is detected based on a specified threshold $V_D$. If so, in step 622, the trend detector 446 of the DTC engine 440 creates and sends a notification to the trend manager 450 of the DTC engine 440. In step 624, if the trend manager 450 receives notifications at or above a predefined threshold $V_C$, the trend manager 450 instructs the cluster manager 456 to create a new cluster based on the formation group in which the slot was added in step 616. In some embodiments, the DTC engine 440 monitors the frequency that trend notifications are created and, when the frequency of the trend notifications reaches the specified threshold $V_C$, oversees the creation of a new cluster for that particular formation group. After a new cluster is created the DTC engine 440 waits for the next slot or natural language input to be received (such as by returning to step 602).

Although not shown here, in some embodiments, the DTC engine 440 also monitors existing clusters to identify when clusters are not trending. For example, a cluster can be identified as not trending when the DTC engine 440 does not detect any new slots being updated to the cluster or when the DTC engine does not analyze the cluster for receiving new slots (such as in step 608) for a specified time period. Thereafter, the cluster can be deleted, or the cluster can be downgraded to a formation group (which can be deleted at some point in time if the slot frequency is not updated for the formation group).

Although FIGS. 6A and 6B illustrates one example of a method 600 for forming clusters, various changes may be made to FIGS. 6A and 6B. For example, while shown as a series of steps, various steps in FIGS. 6A and 6B could overlap, occur in parallel, or occur any number of times.

FIG. 7 illustrates an example method 700 for providing slot information from an existing cluster in accordance with an embodiment of this disclosure. The method 700 may be performed by the server 104 or any of the client devices 106-114 of FIG. 1, the server 200 of FIG. 2, the electronic device 300 of FIG. 3, the electronic device 420 or the server 430 of FIG. 4A, or any other suitable device or system. For ease of explanation, the method 700 is described as being performed by the DTC engine 440 of FIGS. 4A, 4B, and 4C.

In step 710, the DTC engine 440 receives the natural language input from a support module, such as the NLU ontology 436. The received natural language input can represent information associated with a received natural language input from a virtual assistant device. One or more keywords can be extracted from the natural language input. In step 720, the DTC engine 440 determines whether a keyword corresponds to an existing cluster. In some embodiments, the received keyword is analyzed by the similarity detector 444 using a similarity algorithm to determine whether the keyword is similar to an existing cluster. If the keyword is not similar to an existing cluster, the DTC engine 440 discards the keywords and the natural language input and waits for the next slot to be received (such as by returning to step 710).

If the DTC engine 440 determines that one of the keywords corresponds to an existing cluster, in step 730, the DTC engine 440 generates a grouping of associated slots from the particular cluster. The grouping can include a listing of information from the cluster. In step 740, the DTC engine 440 transmits the grouping of associated slots to the NLU ontology. In some embodiments, the NLU ontology enables the NLU system to extract relevant information from the received grouping, which enables the NLU system to provide subsequent questions and smarter responses to the received natural language input from the user.

Although FIG. 7 illustrates one example of a method 700 for providing slot information from an existing cluster, various changes may be made to FIG. 7. For example, while shown as a series of steps, various steps in FIG. 7 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for trend clustering comprising:
   extracting a keyword and a slot from a natural language input, the slot including information;
   determining whether the keyword corresponds to one of a plurality of formation groups;
   in response to determining that the keyword corresponds to a specific formation group of the plurality of formation groups, updating metadata of the specific formation group with the information of the slot;
   in response to determining that the keyword does not correspond to any of the plurality of formation groups, determining whether the keyword corresponds to one of a plurality of clusters;
   in response to determining that the keyword corresponds to a specific cluster of the plurality of clusters, updating the specific cluster with the information of the slot, wherein the specific cluster includes additional information related to the keyword;
   in response to determining that the keyword does not correspond to any of the plurality of clusters, creating an additional formation group that includes the keyword and the slot; and
   providing the additional information as missing information to the natural language input prior to executing the natural language input.

2. The method of claim 1, further comprising:
receiving, from a natural language understanding (NLU) ontology, a second natural language input including second information;
extracting a second keyword from the second natural language input;
determining whether the second keyword corresponds to any of the plurality of clusters;
in response to determining that the second keyword corresponds to a particular cluster of the plurality of clusters, generating a grouping of slots from the particular cluster; and
transmitting the grouping of slots to the NLU ontology.

3. The method of claim 1, further comprising:
in response to updating the metadata of the specific formation group, identifying whether the specific formation group is trending based on a frequency that slots are updated to the specific formation group, wherein the trending is identified based on a first threshold;
in response to identifying that the specific formation group is trending, generating a trend notification;
monitoring a frequency that trend notifications are generated for the specific formation group; and
creating a new cluster from the specific formation group based on a second threshold, the specific formation group including multiple slots of differing information of an event.

4. The method of claim 3, wherein:
determining whether the keyword corresponds to one of the plurality of formation groups comprises analyzing the keyword and the plurality of formation groups based on at least one of: a latent Dirichlet allocation analysis, a mutual similarity score based on n-grams analysis, a singular value decomposition analysis, a nearest neighbor analysis, and a cosine similarity analysis; and
identifying whether the specific formation group is trending comprises analyzing the specific formation group based on at least one of: a burst detection with smoothing analysis, a spline regression with smoothing analysis, a non-parametric correlation coefficient analysis, a least square regression analysis, a multivariate Bayesian scan statistical analysis, and a hybrid n-gram analysis.

5. The method of claim 1, further comprising:
receiving multiple slots related to an event; and
creating an additional cluster or updating an existing cluster based on the multiple slots.

6. The method of claim 1, wherein:
each of the plurality of formation groups represents a set of information related to a respective event; and
each of the plurality of clusters represents another set of information relating to a respective trending event.

7. The method of claim 1, further comprising:
monitoring each of the plurality of clusters to identify when any of the plurality of clusters relates to a non-trending event; and
deleting an identified cluster that relates to the non-trending event.

8. An electronic device comprising:
at least one processor configured to:
extract a keyword and a slot from a natural language input, the slot including information;
determine whether the keyword corresponds to one of a plurality of formation groups;
in response to determining that the keyword corresponds to a specific formation group of the plurality of formation groups, update metadata of the specific formation group with the information of the slot;
in response to determining that the keyword does not correspond to any of the plurality of formation groups, determine whether the keyword corresponds to one of a plurality of clusters;
in response to determining that the keyword corresponds to a specific cluster of the plurality of clusters, update the specific cluster with the information of the slot, wherein the specific cluster includes additional information related to the keyword;
in response to determining that the keyword does not correspond to any of the plurality of clusters, create an additional formation group that includes the keyword and the slot; and
provide the additional information as missing information to the natural language input prior to executing the natural language input.

9. The electronic device of claim 8, wherein the at least one processor is further configured to:
receive, from a natural language understanding (NLU) ontology, a second natural language input including second information;
extract a second keyword from the second natural language input;
determine whether the second keyword corresponds to any of the plurality of clusters;
in response to determining that the second keyword corresponds to a particular cluster of the plurality of clusters, generate a grouping of slots from the particular cluster; and
transmit the grouping of slots to the NLU ontology.

10. The electronic device of claim 8, wherein the at least one processor is further configured to:
in response to updating the metadata of the specific formation group, identify whether the specific formation group is trending based on a frequency that slots are updated to the specific formation group, wherein the trending is identified based on a first threshold;
in response to identifying that the specific formation group is trending, generate a trend notification;
monitor a frequency that trend notifications are generated for the specific formation group; and
create a new cluster from the specific formation group based on a second threshold, the specific formation group including multiple slots of differing information of an event.

11. The electronic device of claim 10, wherein:
to determine whether the keyword corresponds to one of the plurality of formation groups, the at least one processor is configured to analyze the keyword and the plurality of formation groups based on at least one of: a latent Dirichlet allocation analysis, a mutual similarity score based on n-grams analysis, a singular value decomposition analysis, a nearest neighbor analysis, and a cosine similarity analysis; and
to identify whether the specific formation group is trending, the at least one processor is configured to analyze the specific formation group based on at least one of: a burst detection with smoothing analysis, a spline regression with smoothing analysis, a non-parametric correlation coefficient analysis, a least square regression analysis, a multivariate Bayesian scan statistical analysis, and a hybrid n-gram analysis.

12. The electronic device of claim 8, wherein the at least one processor is further configured to:
  receive multiple slots related to an event; and
  create an additional cluster or update an existing cluster based on the multiple slots.

13. The electronic device of claim 8, wherein:
  each of the plurality of formation groups represents a set of information related to a respective event; and
  each of the plurality of clusters represents another set of information relating to a respective trending event.

14. The electronic device of claim 8, wherein the at least one processor is further configured to:
  monitor each of the plurality of clusters to identify when any of the plurality of clusters relates to a non-trending event; and
  delete an identified cluster that relates to the non-trending event.

15. A non-transitory machine-readable medium containing instructions that when executed cause at least one processor of an electronic device to:
  extract a keyword and a slot from a natural language input, the slot including information;
  determine whether the keyword corresponds to one of a plurality of formation groups;
  in response to determining that the keyword corresponds to a specific formation group of the plurality of formation groups, update metadata of the specific formation group with the information of the slot;
  in response to determining that the keyword does not correspond to any of the plurality of formation groups, determine whether the keyword corresponds to one of a plurality of clusters;
  in response to determining that the keyword corresponds to a specific cluster of the plurality of clusters, update the specific cluster with the information of the slot, wherein the specific cluster includes additional information related to the keyword;
  in response to determining that the keyword does not correspond to any of the plurality of clusters, create an additional formation group that includes the keyword and the slot; and
  provide the additional information as missing information to the natural language input prior to executing the natural language input.

16. The non-transitory machine-readable medium of claim 15, wherein the instructions when executed further cause the at least one processor to:
  receive, from a natural language understanding (NLU) ontology, a second natural language input including second information;
  extract a second keyword from the second natural language input;
  determine whether the second keyword corresponds to any of the plurality of clusters;
  in response to determining that the second keyword corresponds to a particular cluster of the plurality of clusters, generate a grouping of slots from the particular cluster; and
  transmit the grouping of slots to the NLU ontology.

17. The non-transitory machine-readable medium of claim 15, wherein the instructions when executed further cause the at least one processor to:
  in response to updating the metadata of the specific formation group, identify whether the specific formation group is trending based on a frequency that slots are updated to the specific formation group, wherein the trending is identified based on a first threshold;
  in response to identifying that the specific formation group is trending, generate a trend notification;
  monitor a frequency that trend notifications are generated for the specific formation group; and
  create a new cluster from the specific formation group based on a second threshold, the specific formation group including multiple slots of differing information of an event.

18. The non-transitory machine-readable medium of claim 15, wherein the instructions when executed further cause the at least one processor to:
  receive multiple slots related to an event; and
  create an additional cluster or update an existing cluster based on the multiple slots.

19. The non-transitory machine-readable medium of claim 15, wherein:
  each of the plurality of formation groups represents a set of information related to a respective event; and
  each of the plurality of clusters represents another set of information relating to a respective trending event.

20. The non-transitory machine-readable medium of claim 15, wherein the instructions when executed further cause the at least one processor to:
  monitor each of the plurality of clusters to identify when any of the plurality of clusters relates to a non-trending event; and
  delete an identified cluster that relates to the non-trending event.

* * * * *